Nov. 30, 1943. D. J. BERGMAN 2,335,478
EXPANSION JOINT
Filed Oct. 17, 1940 2 Sheets-Sheet 1

INVENTOR
DONALD J. BERGMAN
BY *Lee J. Gary*
ATTORNEY

Patented Nov. 30, 1943

2,335,478

UNITED STATES PATENT OFFICE 2,335,478

EXPANSION JOINT

Donald J. Bergman, Chicago, Ill., assignor to Universal Oil Products Company, Chicago, Ill., a corporation of Delaware Application October 17, 1940, Serial No. 361,477

3 Claims. (Cl. 285—90)

The invention is addressed to the problem of compensating for longitudinal expansion in pipe lines and the like between points of anchorage therein and provides an improved form of device for accomplishing this.

The usual practice is to provide a fluid-tight, telescopic type expansion joint or longitudinally flexible expansion member in the line to take up longitudinal expansion in the latter between its anchor points. In such instances, the expansion occurs in the direction of the joint or expansion member which slides or is deformed along its longitudinal axis to relieve the strains which would otherwise be set up in the pipe line between the two anchor points therein in the absence of an expansion joint.

In the apparatus provided by the invention, I provide two flexible corrugated elements connected to the opposite ends of a section of relatively rigid conduit. The ends of said elements not connected to said conduit are provided with conduit connections which adapt the apparatus to be placed in the pipe line wherein it serves to relieve expansion stresses, and elongated, relatively slender members, such as limit bolts, disposed in a common plane adjacent diametrically opposite sides of said flexible elements are secured at their opposite ends to said conduit connections to prevent any substantial expansion of the corrugated elements along the central axis thereof, i. e., limiting the total length of the assembly. This assembly may be installed as an expansion-compensating device between points of anchorage in a pipe line or the like, placing the plane of said limit bolts at substantially a right angle to the direction of expansion in said line. This results in an expansion joint with very little restraint or thrust against anchor points in the line, as distinguished from conventional expansion joints, such as above mentioned, which take direct expansion of the line by contraction of the expansion joint or member. With the conventional construction and arrangement, a thrust equal to the force generated in the line operating over the maximum internal diameter of the expansion joint is applied against the anchors, whereas with the improved construction and arrangement provided by the invention, at least a major portion of this thrust is taken by the limit bolts, thereby relieving the anchors of any considerable strain and accomplishing one of the primary objects of the invention.

By employing an expansion device of the type herein provided, the objective of substantially eliminating thrust against anchor points in piping subjected to heat and expansion is achieved without expensive and troublesome swing-joint arrangements and without excessively lengthy and expensive pipe bends, which are the conventional means whereby this objective is approached. The improved expansion joint provided also possesses the ability to take large amounts of expansion in a direction at right angles to a bend in the line (i. e., it accommodates a translation of forces which is greatly limited in expansion joints of conventional form). It will also handle angular deflection of the line.

In the accompanying diagrammatic drawings, Figure 1 is an elevational view of one form of the expansion joint assembly provided by the invention.

Figs. 2 and 3 are enlarged sectional details illustrating the manner in which the limit bolts of Fig. 1 are engaged with the rest of the assembly. The section shown in Fig. 2 is taken along a plane indicated by line 2—2 in Fig. 1 and the section shown in Fig. 3 is taken along a plane indicated by the line 3—3 in Fig. 2.

Figure 1:
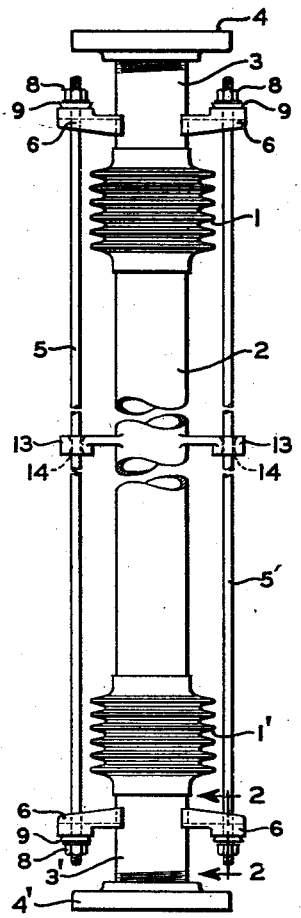
Figure 2:
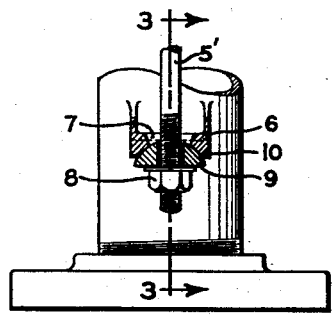
Figure 3:
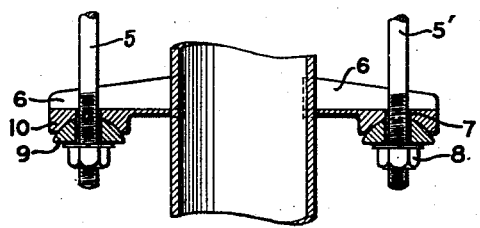

Referring to Figs. 1, 2 and 3, the two members which impart flexibility to the apparatus are substantially identical, in the case here illustrated, and are designated by the reference numerals 1 and 1'. These members are preferably formed of relatively light gauge metal or metallic alloy, such as copper or stainless steel, for example, capable of withstanding the conditions of service to which the apparatus is subjected. They are of the general form commonly termed a "sylphonic bellows."

One end of each of the members 1 and 1' is secured by welding or in any other suitable conventional manner to a relatively rigid conduit 2 and are likewise secured at their opposite ends to the respective conduits 3 and 3' which serve as connectors for attaching the expansion joint assembly in position in the pipe line, not shown in this figure of the drawing, wherein it is employed to accommodate longitudinal expansion and contraction of the line. In this particular instance, the attachment of members 3 and 3' in the line is accomplished by means of flanges 4 and 4' which may be integral with, screwed, welded or otherwise secured in any conventional manner to the outer ends of the respective members 3 and 3' and which are bolted to companion flanges, not illustrated, in said pipe line. Pipe couplings or collars or any other conventional form of union may be employed, when desired, in place of companion flanges.

The limit bolts or stays 5 and 5' are tension members which take endwise thrust in the assembly, created by the tendency of members 1 and 1' to expand longitudinally when internal pressure is applied thereto, are disposed on diametrically opposite sides of the assembly and are each attached at their opposite ends to the rest of the assembly on opposite sides of members 1 and 1'. In the case here illustrated, the attachment of members 5 and 5' is accomplished by four substantially identical lugs each designated by the reference numeral 6, two of these members being secured by welding or any other convenient manner to member 3 on diametrically opposite sides thereof and the other two attaching lugs being likewise secured to member 3' on diametrically opposite sides thereof, the attaching lugs and limit bolts all being disposed in a common plane.

As illustrated in Figs. 2 and 3, each of the lugs 6 is provided adjacent its outer end with an oblong opening 7, the maximum dimension of this opening being transverse to the length of the lug and substantially parallel to the direction of lineal expansion and contraction of the line in which the assembly is employed. The ends of the limit bolts extend through openings 7 in the attaching lugs and are provided with take-up nuts 8 and ball joint members 9, the companion member of the ball joint comprising a portion 10 of the attaching lugs penetrated by openings 7.

At substantially the mid-point in the length of conduit 2, two guide members 13 for the limit bolts are provided on diametrically opposite sides of the conduit. Each of the limit bolts passes through an opening 14 in its guide member 13, the openings preferably being of the general shape illustrated so that no twisting strain is imposed on the guide members when the flexible members 1 and 1' are deformed, in the manner provided, in service. The guide members function to prevent member 2 from springing out of place due to internal pressure acting on the flexible members when the joint is deformed due to expansion in the line.

Figure 4:
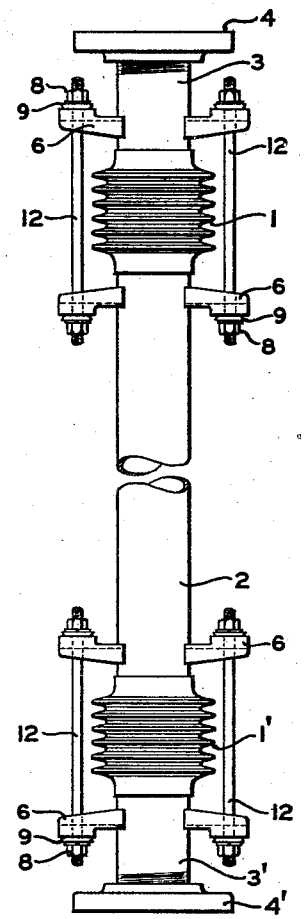
Fig. 4 illustrates a modified form of the apparatus provided by the invention.

The apparatus shown in Fig. 4 is similar to that illustrated in Fig. 1 (corresponding parts being designated by the same reference numerals) except that four limit bolts 12 are employed which are shorter than the two limit bolts 5 utilized in the apparatus of Fig. 1. Each pair of the limit bolts 12 of Fig. 4 restrains one of the flexible bellows members, four attaching lugs 6, similar to those of Fig. 1, being employed. Two of the lugs 6 are secured to conduit 3 and two others to conduit 3' as in Fig. 1, while the other four lugs are secured to conduit 2, two of them being adjacent the flexible bellows 1 and the other adjacent the flexible bellows 1', as illustrated, and all of the limit bolts and attaching lugs being disposed in a common plane.

With a device of the form illustrated in Fig. 1, longitudinal expansion of conduit 2 is taken by direct compression of the flexible bellows 1 and 1', whereas with the form of apparatus illustrated in Fig. 4, longitudinal expansion of conduit 2 lengthens the assembly (i. e., the distance between the faces of flanges 4 and 4'). The two forms are, therefore, not fully equivalent but each has certain advantages over the other in different applications of the device. The form shown in Fig. 1 is advantageous over that shown in Fig. 4 whenever the arrangement is such that stresses in the pipe line in which the expansion joint assembly is used can be prevented or reduced by keeping the over-all length of said assembly substantially constant. The device illustrated in Fig. 4 is advantageous over that illustrated in Fig. 1 when stresses in the pipe line in which the expansion joint assembly is employed can be prevented or reduced by allowing the over-all length of the assembly to change with changes in temperature.

Figure 5:
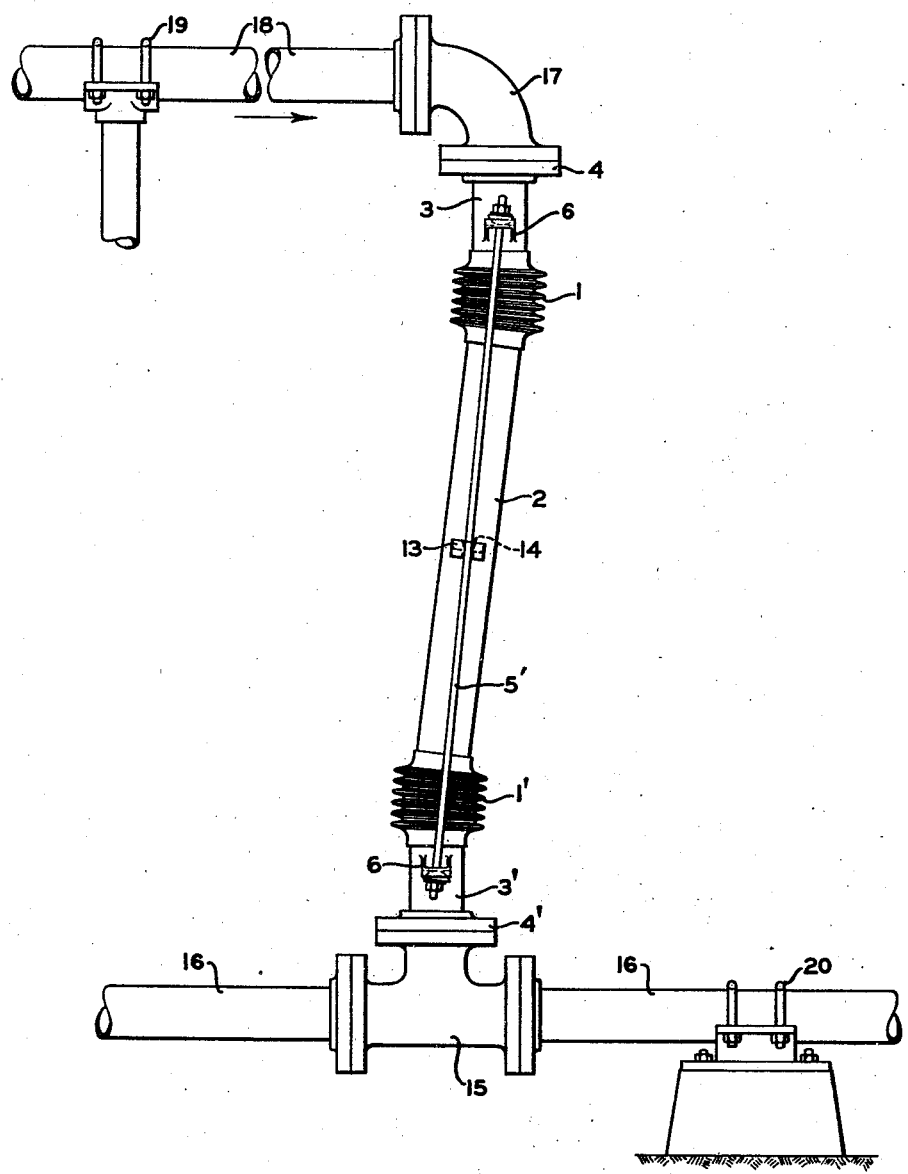
Fig. 5 represents an elevational view of a portion of a pipe line incorporating a device, such as illustrated in Fig. 1, to compensate for longitudinal expansion of the line between anchor points therein.

It will be apparent, with reference to Fig. 5, how the improved type of expansion joint provided by the invention functions to compensate for longitudinal expansion in a pipe line between points at which the latter is anchored. The expansion joint assembly here illustrated is the same as that illustrated in Fig. 1 and corresponding parts in the two figures are designated by the same reference numerals. The expansion joint assembly is disposed between T 15 in conduit 16 and L 17 at one end of a relatively long conduit 18. A suitable anchor, such as illustrated, for example, at 19, serves to prevent substantial movement of line 18 at this point and a similar anchor 20 serves to prevent any substantial movement of conduit 16 at its point of anchorage.

With the hook-up illustrated in Fig. 5, conduit 18 will expand in the direction indicated by the arrow adjacent the latter when its temperature increases, causing conduit 2 in the expansion joint assembly to be deflected from a substantially vertical position to an inclined position such as illustrated. This deflection takes place without imposing any substantial strain in the line fittings 15 and 17, due to the flexibility of members 1 and 1' which are compressed on one side and expanded on the other, as illustrated.

There are, of course, many specific manners, other than that illustrated in Fig. 5, in which the improved form of expansion joint assembly provided by the invention may be employed to advantage. These will be apparent to those familiar with the problems encountered in compensating for lineal expansion in pipe lines and the like. Additional illustrations of specific applications of the improved device provided are, therefore, considered unnecessary to an understanding of the features of the invention and its scope.

The broad concepts of the invention also embrace modifications of the specific forms of apparatus illustrated which will be readily apparent from the teachings of the invention. For example, flexible members, such as metal cables or the like, may be substituted for the relatively rigid limit bolts, when desired, although they are not to be considered fully equivalent and cables, when employed, should be well prestressed to prevent more than a negligible amount of elongation in service. The invention also contemplates other means of securing the ends of the tension members to conduits 3 and 3', this being accomplished, for example, by attaching the ends of the tension members to flanges 4 and 4' instead of directly to the conduits.

I claim as my invention:

1. An apparatus of the class described comprising, in combination, a substantially rigid conduit, flexible bellows members interposed in said conduit adjacent its opposite ends to render it non-rigid at said members, limit bolts extending lengthwise of the conduit and disposed in a common plane on diametrically opposite sides thereof, and means pivotally securing said limit bolts to the conduit adjacent the opposite ends of the latter beyond said bellows members, whereby to prevent substantial elongation of the conduit and substantially restrict relative movement of its opposite ends to a direction transverse to said plane of the limit bolts.

2. An apparatus of the class described comprising, in combination, a substantially rigid conduit, a pair of universally flexible members interposed in said conduit at spaced points in its length to render it non-rigid at said points, a pair of limit bolts disposed in a common plane on diametrically opposite sides of and substantially parallel to the conduit adjacent each of said flexible members and spanning the latter, and means pivotally securing each of said limit bolts to the conduit on opposite sides of the adjacent flexible member, whereby said flexible members are substantially limited to flexure which permits tilting of that portion of the conduit disposed between said flexible members from its normal position by movement of at least one end of the conduit in a direction transverse to the plane of said limit bolts.

3. In a conduit, a device for accommodating longitudinal movement thereof comprising a second conduit connected with and disposed at substantially a right angle to the first named conduit, said second conduit having flexible elements interposed therein at spaced points in its length and means limiting elongation of said second conduit, said means comprising elongated tension members disposed on only two diametrically opposite sides of and substantially parallel to said second conduit in a plane transverse to the line of movement of the first named conduit and secured to said second conduit on opposite sides of said flexible members in such a manner as to permit tilting of that portion of said second conduit between said flexible members upon longitudinal movement of the first named conduit.

DONALD J. BERGMAN.